US012692109B2

(12) United States Patent
Ohhashi et al.

(10) Patent No.: US 12,692,109 B2
(45) Date of Patent: Jul. 28, 2026

(54) IMAGE RECORDING APPARATUS, CONTROL METHOD OF IMAGE RECORDING APPARATUS, AND NON-TRANSITORY COMPUTER-READABLE STORAGE MEDIUM

(71) Applicant: BROTHER KOGYO KABUSHIKI KAISHA, Nagoya (JP)

(72) Inventors: Masashi Ohhashi, Kasugai (JP); Satoru Arakane, Nagoya (JP); Koichi Tsugimura, Nagoya (JP); Haruka Azechi, Nagoya (JP); Yasuhiro Nakano, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 252 days.

(21) Appl. No.: 18/306,335

(22) Filed: Apr. 25, 2023

(65) Prior Publication Data

US 2023/0348215 A1 Nov. 2, 2023

(30) Foreign Application Priority Data

Apr. 27, 2022 (JP) ................................. 2022-073054

(51) Int. Cl.
B65H 3/44 (2006.01)
B65H 5/06 (2006.01)
(Continued)

(52) U.S. Cl.
CPC ................ B65H 5/06 (2013.01); B65H 3/44 (2013.01); B65H 18/08 (2013.01); G03G 15/36 (2013.01);
(Continued)

(58) Field of Classification Search
CPC ................ B65H 2511/414; B65H 3/44; B65H 2701/1862; B65H 2301/12;
(Continued)

(56) References Cited

U.S. PATENT DOCUMENTS 6,744,530 B1 6/2004 Someno et al.
2011/0069329 A1* 3/2011 Abe ...................... G06F 3/1219
358/1.9
(Continued)

FOREIGN PATENT DOCUMENTS

JP 2000-218890 A 8/2000
JP 2004177561 A * 6/2004
(Continued)

OTHER PUBLICATIONS

English language machine translation from Escapnet of JP205-013452A.

*Primary Examiner* — Luis A Gonzalez
(74) *Attorney, Agent, or Firm* — Scully, Scott, Murphy & Presser, P.C.

(57) ABSTRACT

An image recording apparatus includes a conveyance mechanism conveying a sheet-shaped medium in a conveyance direction, a recorder recording an image on the sheet-shaped medium conveyed by the conveyance mechanism, and a controller. The controller receives image data including one or a plurality of images, each of the images being to be recorded on one page, from an external apparatus, and determines whether to perform a combination-recording in which a plurality of images are aligned in the conveyance direction and recorded on a single sheet-shaped medium. In a case where image data including the plurality of images is received and it is determined that the combination-recording is to be performed, the controller causes the conveyance mechanism to convey a single sheet-shaped medium, and (Continued)

causes the recorder to record a plurality of images aligned in the conveyance direction on the single sheet-shaped medium.

11 Claims, 6 Drawing Sheets

(51) Int. Cl.

| | |
|---|---|
| *B65H 18/08* | (2006.01) |
| *G03G 15/00* | (2006.01) |
| *G03G 15/36* | (2006.01) |
| *G06F 3/12* | (2006.01) |

(52) U.S. Cl.
CPC ..... *G03G 15/5095* (2013.01); *G03G 15/6517* (2013.01); *G06F 3/125* (2013.01); *G06F 3/1251* (2013.01); *G06F 3/1252* (2013.01); *B65H 2301/12* (2013.01); *B65H 2301/121* (2013.01); *B65H 2301/122* (2013.01); *B65H 2557/23* (2013.01); *B65H 2557/30* (2013.01); *B65H 2801/03* (2013.01)

(58) Field of Classification Search
CPC ........ B65H 2301/121; B65H 2301/122; G03G 15/36; G03G 15/5095; G03G 15/6517; G03G 15/6523; B41J 11/008; B41J 11/70; B41J 11/663; B41J 11/003; G06F 3/125; G06F 3/1252; G06F 3/1251; G06F 3/1262
See application file for complete search history.

(56) References Cited

U.S. PATENT DOCUMENTS

| | | | |
|---|---|---|---|
| 2013/0021622 A1* | 1/2013 | Yamaguchi | B41J 11/703 |
| | | | 358/1.6 |
| 2016/0247047 A1* | 8/2016 | Shirasaka | G06K 15/022 |
| 2019/0347053 A1* | 11/2019 | Aoyama | G06F 3/125 |

FOREIGN PATENT DOCUMENTS

| | | | |
|---|---|---|---|
| JP | 2006004248 A | | 1/2006 |
| JP | 2006163693 A | | 6/2006 |
| JP | 2009-129191 A | | 6/2009 |
| JP | 2013-239918 A | | 11/2013 |
| JP | 2015013452 A | * | 1/2015 |
| JP | 2021140219 A | | 9/2021 |

* cited by examiner

FRONT ←——→ REAR
FRONT-REAR
DIRECTION

⊙
LEFT-RIGHT
DIRECTION

UPPER
↕ UPPER-LOWER
DIRECTION
LOWER

FRONT ◄────► REAR
FRONT-REAR
DIRECTION

LEFT-RIGHT
DIRECTION

UPPER

UPPER-LOWER
DIRECTION

LOWER

<PROCESSING BY IMAGE PROCESSING UNIT>

IMAGE RECORDING APPARATUS, CONTROL METHOD OF IMAGE RECORDING APPARATUS, AND NON-TRANSITORY COMPUTER-READABLE STORAGE MEDIUM

REFERENCE TO RELATED APPLICATIONS

This application claims priority from Japanese Patent Application No. 2022-073054 filed on Apr. 27, 2022. The entire content of the priority application is incorporated herein by reference.

BACKGROUND ART

A technology enabling large-sized printing by a printer which performs enlarging processing in which a printer driver provided in an upstream apparatus such as a personal computer enlarges a print output from an application is known.

The printer driver of the personal computer (external apparatus) performs the enlarging processing, thereby enabling large-sized printing (recording of an image having a long-length in a conveyance direction). However, when such printer driver is not installed in the external apparatus and only a general-purpose printer driver is installed in the external apparatus, it is difficult to implement a recording of an image having a long-length in the conveyance direction.

DESCRIPTION

An object of the present disclosure is to provide an image recording apparatus, a control method thereof, and a non-transitory computer-readable storage medium storing a program capable of implementing a recording of an image having a long-length in a conveyance direction, regardless of a type of a driver installed in an external apparatus.

According to a first aspect of the present disclosure, there is provided an image recording apparatus including: a conveyance mechanism configured to convey a sheet-shaped medium in a conveyance direction; a recorder configured to record an image on the sheet-shaped medium conveyed by the conveyance mechanism; and a controller configured to: receive image data including one or a plurality of images, each of the images being to be recorded on one page, the image data being provided from an external apparatus; determine whether to perform a combination-recording in which a plurality of images are aligned in the conveyance direction and recorded on a single sheet-shaped medium; and cause the conveyance mechanism to convey a single sheet-shaped medium and cause the recorder to record a plurality of images aligned in the conveyance direction on the single sheet-shaped medium, in a case where image data including the plurality of images is received and it is determined that the combination-recording is to be performed.

According to a second aspect of the present disclosure, there is provided a control method of an image recording apparatus including a conveyance mechanism configured to convey a sheet-shaped medium in a conveyance direction, and a recorder configured to record an image on the sheet-shaped medium conveyed by the conveyance mechanism, the control method including: receiving image data including one or a plurality of images, each of the images being to be recorded on one page, the image data being provided from an external apparatus, determining whether to perform a combination-recording in which a plurality of images are aligned in the conveyance direction and recorded on a single sheet-shaped medium; and causing the conveyance mechanism to convey a single sheet-shaped medium and causing the recorder to record a plurality of images aligned in the conveyance direction on the single sheet-shaped medium, in a case where image data including the plurality of images is received and it is determined that the combination-recording is to be performed.

According to a third aspect of the present disclosure, there is provided a non-transitory computer-readable storage medium storing a program executable by a computer of an image recording apparatus that includes a conveyance mechanism configured to convey a sheet-shaped medium in a conveyance direction, and a recorder configured to record an image on the sheet-shaped medium conveyed by the conveyance mechanism, the program including instructions that, when executed by the computer, cause the image recording apparatus to perform: receiving image data including one or a plurality of images, each of the images being to be recorded on one page, the image data being provided from an external apparatus; determining whether to perform a combination-recording in which a plurality of images are aligned in the conveyance direction and recorded on a single sheet-shaped medium; and causing the conveyance mechanism to convey a single sheet-shaped medium and causing the recorder to record a plurality of images aligned in the conveyance direction on the single sheet-shaped medium, in a case where image data including the plurality of images is received and it is determined that the combination-recording is to be performed.

According to the present disclosure, in the case where image data including a plurality of images is received and it is determined that combination-recording is to be performed, the image recording apparatus causes the conveyance mechanism to convey a single sheet-shaped medium and causes the recorder to record the plurality of images aligned in the conveyance direction on the single sheet-shaped medium. This makes it possible to record an image having a long-length in the conveyance direction, regardless of a type of a driver installed in the external apparatus.

FIRST EMBODIMENT

Figure 1:
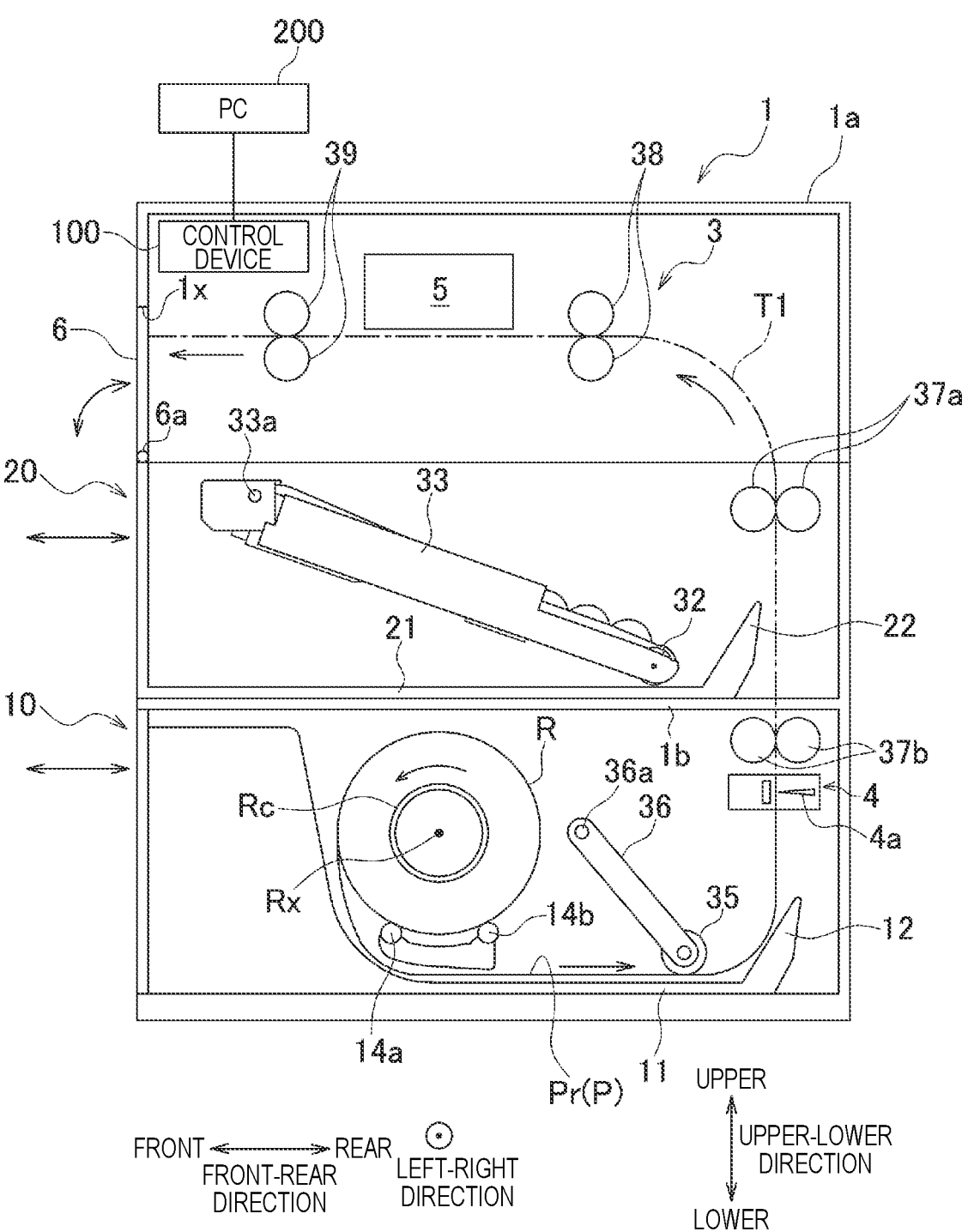
FIG. 1 is a schematic side view showing an internal structure of a printer in a state where a roll body is accommodated.
Figure 2:
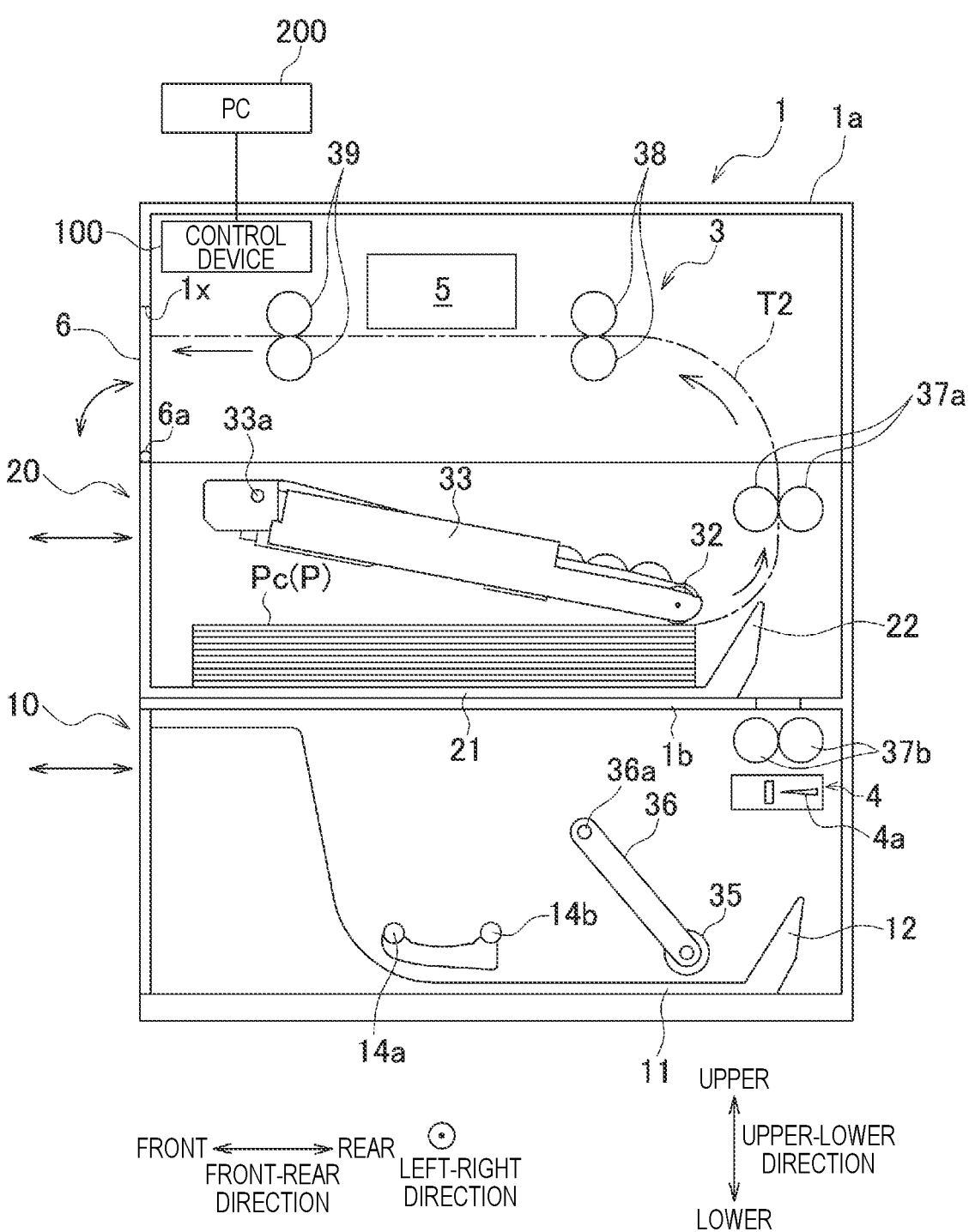
FIG. 2 is a schematic side view showing an internal structure of the printer in a state where cut sheets are accommodated in the printer of FIG. 1.

As shown in FIGS. 1 and 2, a printer 1 (image recording apparatus) according to a first embodiment of the present disclosure includes a housing 1a, sheet feeding trays 10 and 20 detachably mounted to the housing 1a, and a sheet discharge tray 6. The sheet feeding tray 10 corresponds to the "first accommodation part" of the present disclosure, and the sheet feeding tray 20 corresponds to the "second accommodation part" of the present disclosure.

The sheet feeding trays 10 and 20 have a box shape opening upward and are movable in a front-rear direction with respect to the housing 1a. The sheet feeding trays 10 and 20 are pulled out of the housing 1a by moving forward with respect to the housing 1a, and are mounted to the housing 1a by moving rearward with respect to the housing 1a. The sheet feeding trays 10 and 20 can take mount positions (refer to FIGS. 1 and 2) at which they are mounted to the housing 1a and pull-out positions (not shown) ahead of the mount positions. When the sheet feeding trays 10 and 20 are at the mount positions, the sheet feeding tray 20 overlaps the sheet feeding tray 10 in an upper-lower direction and is arranged above the sheet feeding tray 10.

The sheet discharge tray 6 is constituted by a sidewall of an upper front part of the housing 1a. The sheet discharge tray 6 can take an open position (not shown) for opening an opening 1x of the housing 1a and a closed position for closing the opening 1x (refer to FIGS. 1 and 2) by rotating about a shaft 6a along a left-right direction.

The printer 1 further includes a conveyance mechanism 3, a cutting mechanism 4, a head 5, and a control device 100. Elements of the conveyance mechanism 3 except rollers 14a and 14b described later, the cutting mechanism 4, the head 5, and the control device 100 are supported by the housing 1a.

The conveyance mechanism 3 is configured to selectively convey a sheet P from the sheet feeding trays 10 and 20, and includes rollers 14a and 14b, rollers 32 and 35 and arms 33 and 36, pairs of rollers 37a, 37b, 38 and 39, and a conveying motor 30 (refer to FIG. 3) for driving each of the rollers.

The sheet P is a general term for a roll sheet Pr (refer to FIG. 1) and a cut sheet Pc (refer to FIG. 2), and corresponds to the "sheet-shaped medium" of the present disclosure. The cut sheet Pc is shorter than the roll sheet Pr in a conveyance direction (a direction in which the sheet P is conveyed by the conveyance mechanism 3).

In the conveyance mechanism 3, the rollers 14a and 14b, the roller 35 and arm 36, and the pairs of rollers 37a, 37b, 38, 39 constitute a conveyance path T1 along which the roll sheet Pr is conveyed from the sheet feeding tray 10 to the sheet discharge tray 6 through a lower side of the head 5 (refer to FIG. 1). In the conveyance mechanism 3, the roller 32 and the arm 33, and the pairs of rollers 37a, 38, and 39 constitute a conveyance path T2 along which the cut sheet Pc is conveyed from the sheet feeding tray 20 to the sheet discharge tray 6 through the lower side of the head 5 (refer to FIG. 2). A part from the pair of rollers 37a to the sheet discharge tray 6 in the conveyance paths T1 and T2 is common.

As shown in FIG. 1, the sheet feeding tray 10 enables to accommodate a roll body R. The roll body R has a configuration where the long roll sheet Pr is rolled in a roll shape on an outer peripheral surface of a cylindrical core member Rc. The roll body R is accommodated in the sheet feeding tray 10 with its rotational axis Rx (central axis of the core member Rc) extending in the left-right direction.

At a bottom part of the sheet feeding tray 10, the rollers 14a and 14b are arranged. The rollers 14a and 14b are each rotatable about an axis along the left-right direction. When the roll body R is accommodated in the sheet feeding tray 10, an outer peripheral surface of a lower part of the roll body is supported by the rollers 14a and 14b.

When setting the roll body R, the roll body R is manually rotated in a counterclockwise direction in FIG. 1 to unwind the roll sheet Pr from the roll body R. Then, a tip end of the roll sheet Pr is sandwiched between the roller 35 and a bottom wall 11 of the sheet feeding tray 10. In this state, when the conveying motor 30 (refer to FIG. 3) is driven under control of the control device 100, the rollers 14a, 14b and 35 rotate, and the roll sheet Pr is fed rearward. The roll sheet Pr fed from the sheet feeding tray 10 by the roller 35 comes into contact with a sidewall 12 at the rear of the sheet feeding tray 10, moves along the sidewall 12, and is guided to the cutting mechanism 4.

The roller 35 is supported by one end of the arm 36. The other end of the arm 36 is supported by the housing 1a via a shaft 36a along the left-right direction. The arm 36 is rotatable about the shaft 36a. The arm 36 is urged by an urging member (not shown) so that the roller 35 is in close to the bottom wall 11.

Figure 3:
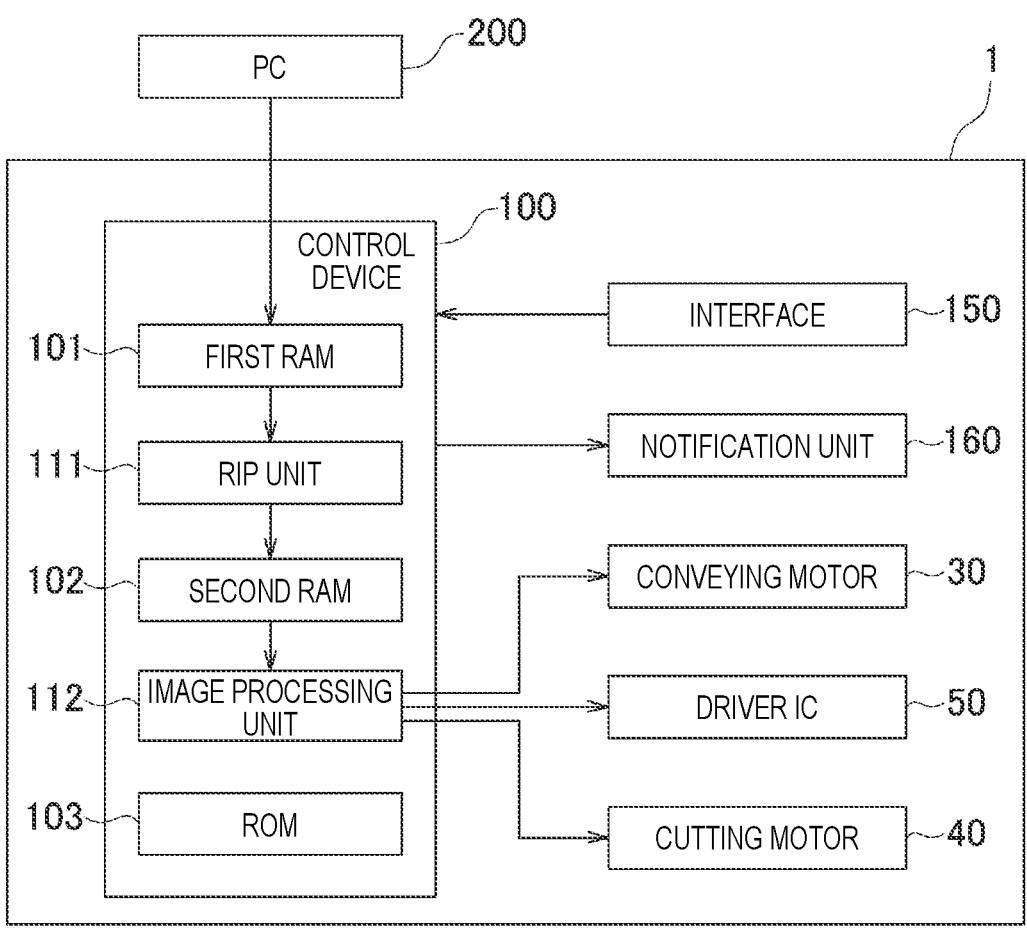
FIG. 3 is a block diagram showing an electrical configuration of the printer of FIG. 1.

The cutting mechanism 4 includes a cutter 4a and a cutting motor 40 (refer to FIG. 3). The cutter 4a is arranged above the sidewall 12 at the rear of the sheet feeding tray 10 and below the pair of rollers 37b. The cutter 4a consists of, for example, a disk-shaped rotary blade and a driven blade. Alternatively, the cutter 4a may consist of a rotary blade and a fixed blade. When the cutting motor 40 is driven under control of the control device 100, the rotary blade reciprocates in the left-right direction while rotating. The roll sheet Pr is cut in the left-right direction by the cutter 4a.

As shown in FIG. 2, the sheet feeding tray 20 enables to accommodate a plurality of cut sheets Pc stacked in the upper-lower direction. The cut sheet Pc is supported on an upper surface of a bottom wall 21 of the sheet feeding tray 20.

When no cut sheet Pc is accommodated in the sheet feeding tray 20 in a state in which the sheet feeding tray 20 is mounted to the housing 1a, the roller 32 is in contact with the bottom wall 21 (refer to FIG. 1). When the cut sheet Pc is accommodated in the sheet feeding tray 20 in a state in which the sheet feeding tray 20 is mounted to the housing 1a, the roller 32 is in contact with the uppermost cut sheet Pc (refer to FIG. 2). In this state, when the conveying motor 30 (refer to FIG. 3) is driven under control of the control device 100, the roller 32 rotates and the cut sheet Pc is fed rearward.

The roller 32 is supported by one end of the arm 33. The other end of the arm 33 is supported by the housing 1a via a shaft 33a along the left-right direction. The arm 33 is rotatable about the shaft 33a (refer to FIGS. 1 and 2). The arm 33 is urged by an urging member (not shown) so that the roller 32 is in close to the bottom wall 21.

The head 5 (corresponds to the "recorder" of the present disclosure) is of an inkjet type, and has a plurality of nozzles (not shown) formed in a lower surface. When the sheet P conveyed by the conveyance mechanism 3 passes through a position facing the lower surface of the head 5, a driver IC 50 (refer to FIG. 3) is driven under control of the control device 100, so that ink is ejected from the nozzles and lands on the sheet P, and accordingly, an image is recorded on the sheet P. Note that the head 5 may be of a line-type configured to eject the ink from the nozzles in a state where a position is fixed or of a serial-type configured to eject the ink from the nozzles while moving in the left-right direction.

As shown in FIG. 3, the control device 100 is connected to an interface 150, a notification unit 160, the conveying motor 30, the driver IC 50, and the cutting motor 40 via an internal bus (not shown). The interface 150 is an element for a user of the printer 1 to perform an input, and is constituted by, for example, a switch or button that can be pressed by the user. The notification unit 160 is an element for performing a notification to the user, and is constituted by, for example, a display for outputting an image or a speaker for outputting audio.

The control device 100 is further communicatively connected to a PC (Personal Computer) 200 (corresponds to the "external apparatus" of the present disclosure). In the PC 200, a general-purpose printer driver (for example, a printer driver capable of converting image data received from application software into image data in a vector format expressed in PDL (Page Description Language) and outputting the image data) is installed. The PDL is, for example, PCLXL, PCL5, PostScript, PDF, XPS, or the like.

The control device 100 executes recording processing of, based on a recording command (including image data) received from the PC 200 and data input from the interface 150, controlling the conveying motor 30 and the driver IC 50 (further, the cutting motor 40 when performing a recording on the roll sheet Pr) to record an image on the sheet P.

The control device 100 includes two random access memories (RAMs) 101 and 102, a read only memory (ROM) 103, a raster image processor (RIP) unit 111, and an image processing unit 112. The RIP unit 111 and the image processing unit 112 correspond to the "controller" of the present disclosure, and particularly, the RIP unit 111 corresponds to the "first controller" of the present disclosure, and the image processing unit 112 corresponds to the "second controller" of the present disclosure. The second RAM 102 corresponds to the "temporary memory" of the present disclosure.

The first RAM 101 temporarily stores a recording command received from the PC 200.

The RIP unit 111 reads out the recording command from the first RAM 101, and generates recording data (density data of each color of RGB in a raster format (bitmap format)), based on image data (image data in a vector format expressed in PDL (Page Description Language)) included in the recording command. The RIP unit 111 writes the generated recording data into the second RAM 102.

The image processing unit 112 reads out the recording data from the second RAM 102, converts the recording data (i.e., the density data of each color of RGB output from the RIP unit 111) into ejection data (data representing an amount of ejection in each ejection period for each nozzle), and executes the recording processing based on the ejection data.

The ROM 103 stores programs and data for the RIP unit 111 and the image processing unit 112 to perform various types of controls.

The RIP unit 111 is configured by, for example, software mainly composed of a program that operates on a CPU. Alternatively, the RIP unit 111 may be configured by hardware such as an ASIC. Alternatively, the RIP unit 111 may be configured to operate by using both software processing and hardware processing.

Similarly to the RIP unit 111, the image processing unit 112 may also be configured by software mainly composed of a program that operates on the CPU, or may be configured by hardware such as an ASIC, or may be configured to operate by using both software processing and hardware processing.

Figure 4:
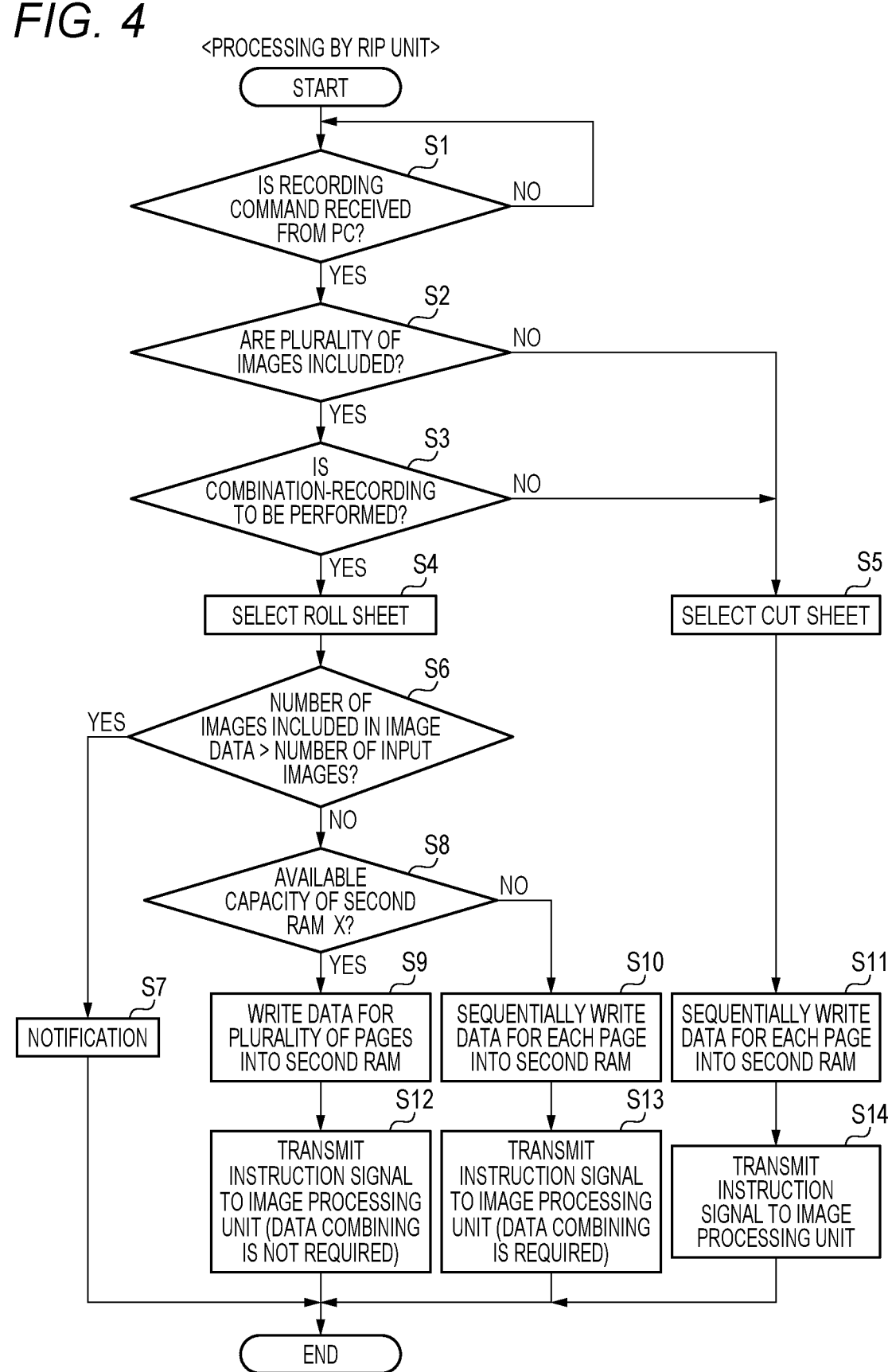
FIG. 4 is a flowchart showing processing that is executed by a RIP unit.

Next, processing that is executed by the RIP unit 111 is described with reference to FIG. 4.

The RIP unit 111 first determines whether a recording command has been received from the PC 200 (S1).

The processing of receiving a recording command from the PC 200 corresponds to the "receiving processing" of the present disclosure. The recording command includes image data, as described above. The image data includes one or a plurality of images, each of which is to be recorded on one page. One image is included in one page. The recording command received from the PC 200 is stored in the first RAM 101.

If it is determined that the recording command has not been received from the PC 200 (S1: NO), the RIP unit 111 repeats the processing of S1.

If it is determined that the recording command has been received from the PC 200 (S1: YES), the RIP unit 111 reads out the recording command from the first RAM 101 and determines whether the image data included in the recording command includes a plurality of images (S2).

If it is determined that the image data included in the recording command includes a plurality of images (S2: YES), the RIP unit 111 determines whether to perform a combination-recording (S3: first determination processing). The combination-recording refers to processing in which a plurality of images are aligned in the conveyance direction and recorded on a single sheet P. The user of the printer 1 can perform an input as to whether to perform combination-recording and an input of the number of images to be combined in the combination-recording to the interface 150. The interface 150 transmits, to the control device 100, data indicating whether to perform the combination-recording, data indicating the number of images to be combined, and the like, based on the user input. The RIP unit 111 performs the determination in S3, based on the data received from the interface 150.

If it is determined that the combination-recording is to be performed (S3: YES), the RIP unit 111 generates selection data indicating selection of the roll sheet Pr as a recording target (S4). The selection data is written to the second RAM 102.

On the other hand, if it is determined that the image data included in the recording command does not include a plurality of images (i.e., the image data includes one image) (S2: NO), or if it is determined that the combination-recording is not to be performed (S3: NO), the RIP unit 111 generates selection data indicating selection of the cut sheet Pc as a recording target (S5). The selection data is written to the second RAM 102.

After S4, the RIP unit 111 determines whether the number of images included in the image data is larger than the number of images input to the interface 150 (the number of images to be combined instructed by the user) (S6).

If the number of images included in the image data is larger than the number of images input to the interface 150 (S6: YES), the RIP unit 111 executes notification processing of, via the notification unit 160 (refer to FIG. 3), notifying that the number of images included in the image data is larger than the number of images input to the interface 150 (S7). In addition, in S7, the RIP unit 111 prompts the user to perform re-input to the interface 150 via the notification unit 160 (refer to FIG. 3).

In S7, the RIP unit 111 may cause the display constituting the notification unit 160 to output an image indicating the above effect, or may cause the speaker constituting the notification unit 160 to output audio indicating the above effect.

After S7, the RIP unit 111 ends the routine. When re-input to the interface 150 is performed, the RIP unit 111 resumes the routine shown in FIG. 4.

If the number of images included in the image data is not larger than the number of images input to the interface 150 (S6: NO), i.e., if the number of images included in the image data is equal to the number of images input to the interface 150, or, if the number of images included in the image data is smaller than the number of images input to the interface 150, the RIP unit 111 determines whether an available capacity of the second RAM 102 is equal to or larger than a predetermined amount X (S8: second determination processing).

If it is determined that the available capacity of the second RAM 102 is equal to or larger than the predetermined amount X (S8: YES), the RIP unit 111 generates recording data relating to a plurality of images aligned in the conveyance direction, based on the image data included in the recording command (generation processing), and writes the generated recording data into the second RAM 102 (output processing). At this time, the RIP unit 111 converts the image data in a vector format into recording data in raster format and writes the recording data for a plurality of pages into the second RAM 102 as data of one page (S9).

If it is determined that the available capacity of the second RAM 102 is not equal to or larger than the predetermined amount X (S8: NO), the RIP unit 111, based on the image data included in the recording command, generates a plurality of recording data each corresponding to each of the plurality of images (generation processing), and sequentially writes the plurality of generated recording data into the second RAM 102 (output processing). At this time, the RIP unit 111 converts the image data in a vector format into recording data in a raster format and sequentially writes the recording data for each page into the second RAM 102 (S10).

After S5, the RIP unit 111 converts the image data in a vector format into recording data in a raster format, and writes the recording data for each page into the second RAM 102 (S11), similarly to S10.

After S9, S10 or S11, the RIP unit 111 transmits, to the image processing unit 112, an instruction signal instructing execution of recording processing (S12, S13 or S14). The instruction signal of S12 includes a notification indicating that data combining is not required. The instruction signal of S13 includes a notification indicating that data combining is required. After S12, S13 or S14, the RIP unit 111 ends the routine.

Figure 5:
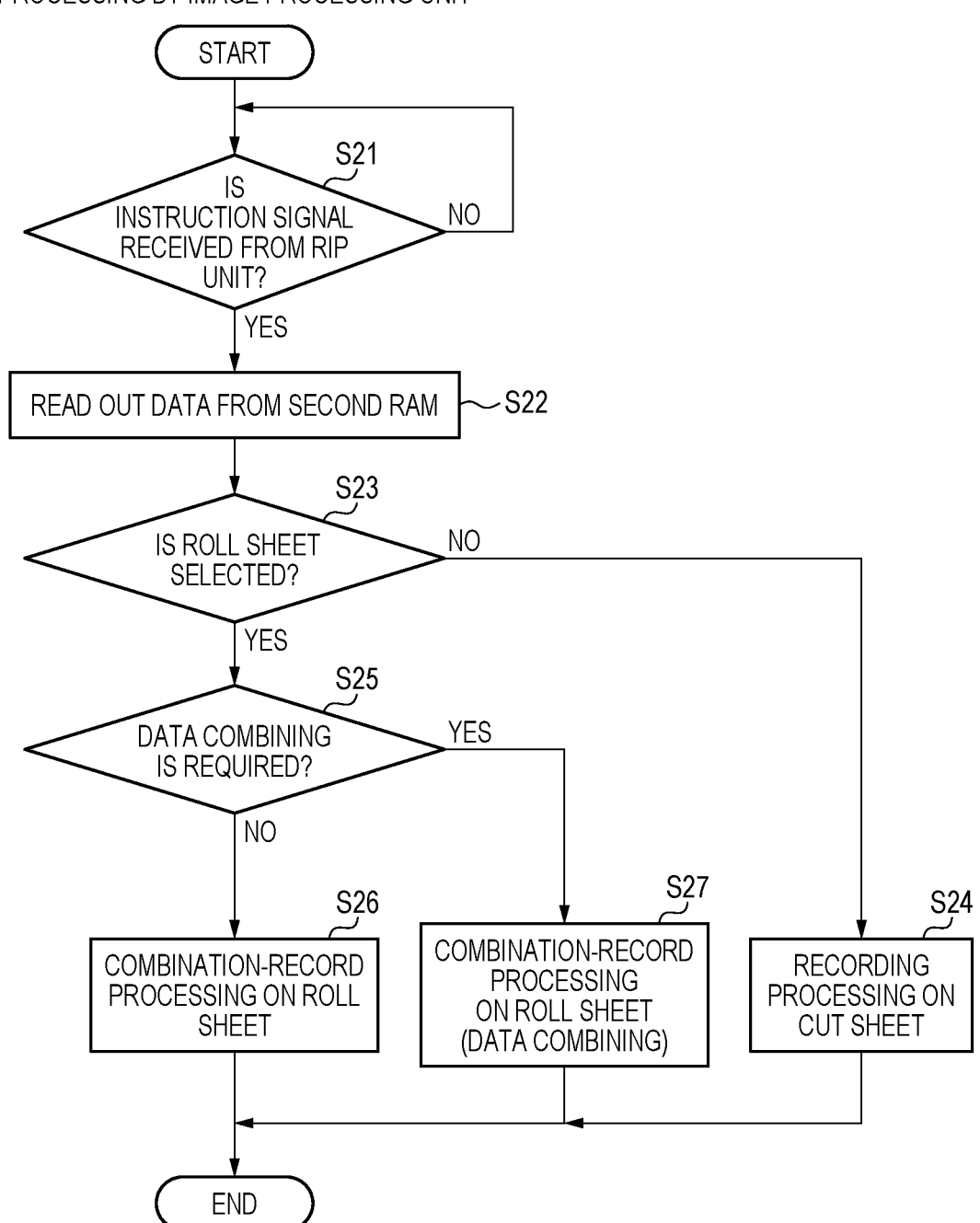
FIG. 5 is a flowchart showing processing that is executed by an image processing unit.

Next, processing that is executed by the image processing unit 112 will be described with reference to FIG. 5.

The image processing unit 112 first determines whether the instruction signal has been received from the RIP unit 111 (S21).

If it is determined that the instruction signal has not been received from the RIP unit 111 (S21: NO), the image processing unit 112 repeats the processing of S21.

If it is determined that the instruction signal has been received from the RIP unit 111 (S21: YES), the image processing unit 112 reads out data (selection data, recording data, etc.) from the second RAM 102 (S22).

After S22, the image processing unit 112 determines whether the selection data read out in S22 indicates selection of the roll sheet Pr (S23).

If it is determined that the selection data does not indicate selection of the roll sheet Pr (i.e., indicates selection of the cut sheet Pc) (S23: NO), the image processing unit 112 converts the recording data read out from the second RAM 102 (density data of each color of RGB output from the RIP unit 111) into ejection data (data indicating an ejection amount in each ejection period for each nozzle), and controls the conveying motor 30 and the driver IC 50 based on the ejection data. Thereby, the conveyance mechanism 3 is caused to convey the cut sheet Pc from the sheet feeding tray 20 along the conveyance path T2 (refer to FIG. 2), and the head 5 is caused to eject ink onto the cut sheet Pc to record an image on the cut sheet Pc (S24). When the image data includes a plurality of images, the image processing unit 112 causes the conveyance mechanism 3 to sequentially convey a plurality of cut sheets Pc, and causes the head 5 to record one image on each cut sheet Pc.

If it is determined that the selection data indicates selection of the roll sheet Pr (S23: YES), it is determined whether the notification included in the instruction signal is a notification indicating that data combining is required (S25).

If it is determined that the notification included in the instruction signal is not a notification indicating that data combining is required (i.e., is a notification indicating that data combining is not required) (S25: NO), the image processing unit 112 converts the recording data read out from the second RAM 102 into ejection data (without performing data combining to be described later), and controls the conveying motor 30, the driver IC 50, and the cutting motor 40 based on the ejection data. In this way, the combination-recording is performed on the roll sheet Pr (S26: combination-record processing).

If it is determined that the notification included in the instruction signal is a notification indicating that data combining is required (S25: YES), the image processing unit 112 performs data combining described later on the recording data sequentially read out from the second RAM 102, converts the data into ejection data, and controls the conveying motor 30, the driver IC 50, and the cutting motor 40. In this way, the combination-recording is performed on the roll sheet Pr (S27: combination-record processing).

In S26 and S27, the image processing unit 112 causes the conveyance mechanism 3 to convey the roll sheet Pr along the conveying path T1 from the sheet feeding tray 10 (refer to FIG. 1), causes the head 5 to continuously record the plurality of images aligned in the conveyance direction on the roll sheet Pr, and causes the cutting mechanism 4 to cut the roll sheet Pr into a predetermined length.

Figure 6:
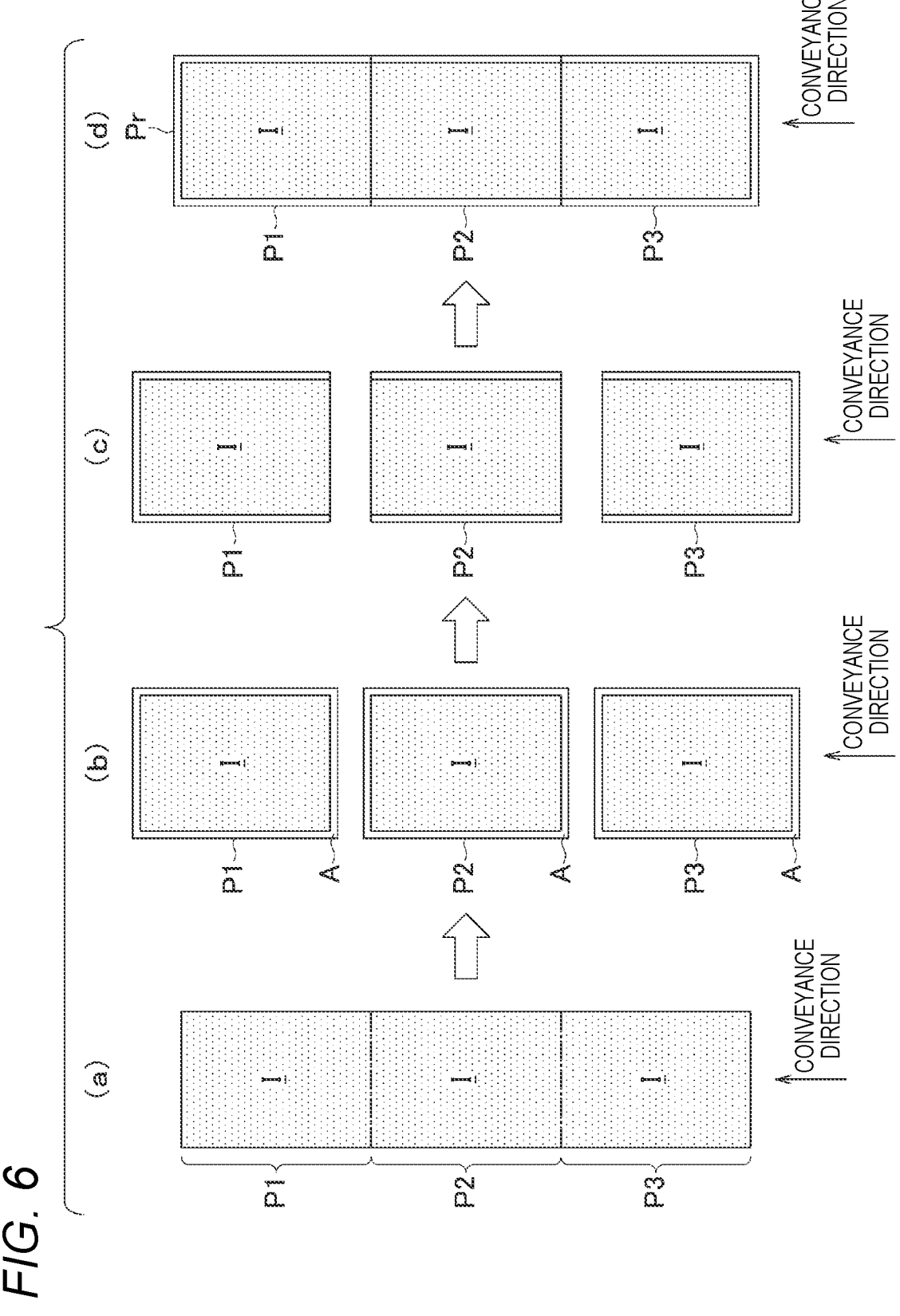
FIG. 6 is a schematic view showing processing of combining data for three pages.

Data combining refers to converting recording data for a plurality of pages into data of one page. Here, data combining will be described with reference to FIG. 6. FIG. 6 exemplifies a case in which image data includes three images I. Image data included in the recording command received from the PC 200 is data for three pages including an image I in each of three pages P1 to P3, as shown as stage (a) in FIG. 6. The RIP unit 111 generates recording data (data in a raster format (bitmap format)) based on the image data (data in a vector format expressed in PDL (Page Description Language)) of stage (a) in FIG. 6. At this time, the RIP unit 111 first generates recording data for each of the pages P1 to P3 (refer to stage (b) in FIG. 6), and then, deletes margins A between the plurality of images I respectively included in two adjacent pages P1 to P3 (refer to stage (c) in FIG. 6). In the present example, a margin A at an upstream end of the first page (the most downstream page with respect to the conveyance direction) P1 with respect to the conveyance direction, margins A at an upstream end and a downstream end of the second page (a page other than the most downstream or upstream page with respect to the conveyance direction) P2 with respect to the conveyance direction, and a margin A at a downstream end of the third page (the most upstream page with respect to the conveyance direction) P3 with respect to the conveyance direction are deleted. Thereafter, if the available capacity of the second RAM 102 is equal to or larger than the predetermined amount X (S8: YES), the RIP unit 111 performs data combining of combining the recording data for three pages P1 to P3 into data of one page (refer to stage (d) in FIG. 6). If the available capacity of the second RAM 102 is less than the predetermined amount X (S8: NO), the image processing unit 112 performs data combining of combining the recording data for three pages P1 to P3 into data of one page (refer to stage (d) in FIG. 6).

As described above, according to the present embodiment, in the printer 1, if it is determined that the image data including a plurality of images is received (S2: YES) and the combination-recording is to be performed (S3: YES), the combination-record processing (S26, S27) of causing the conveyance mechanism 3 to convey the single roll sheet Pr and causing the head 5 to record the plurality of images aligned in the conveyance direction on the single roll sheet Pr is executed. This makes it possible to record an image having a long-length in the conveyance direction, regardless of the type of the printer driver installed in the PC 200 (refer to FIG. 6).

The printer 1 makes the plurality of images I to be continuously recorded in the conveyance direction, in the combination-record processing (refer to FIG. 6). This makes it possible to record an image having a long-length in the conveyance direction on the single roll sheet Pr without a margin A between the adjacent images I.

The printer 1 deletes the margins A between the plurality of images I respectively included in two adjacent pages P1 to P3 (refer to stages (b) and (c) in FIG. 6) so that the plurality of images I are continuously recorded in the conveyance direction (refer to stage (d) in FIG. 6). The above configuration is particularly preferable when the head 5 is of an inkjet type.

The printer 1 includes the RIP unit 111 and the image processing unit 112 (refer to FIG. 3). The RIP unit 111 executes the generation processing of generating a plurality of recording data each corresponding to each of a plurality of images based on the image data, and the output processing of sequentially outputting the plurality of recording data (S10). The image processing unit 112 causes the head 5 to record the plurality of images aligned in the conveyance direction on the single roll sheet Pr, based on the plurality of recording data sequentially output from the RIP unit 111 (S27). In this case, it is possible to start recording at an earlier timing than in the case in which the recording data corresponding to the plurality of images is integrated and output (S9, S26).

The printer 1 includes the RIP unit 111 and the image processing unit 112 (refer to FIG. 3). The RIP unit 111 executes the generation processing of generating recording data relating to the plurality of images I (refer to stage (d) in FIG. 6) aligned in the conveyance direction, based on the image data, and the output processing of outputting the generated recording data (S9). Based on the plurality of recording data output from the RIP unit 111, the image processing unit 112 causes the head 5 to record the plurality of images aligned in the conveyance direction on the single roll sheet Pr (S26). In this case, since the image processing unit 112 only needs to perform the recording processing based on the recording data output from the RIP unit 111 (without performing data combining), a favorable recording quality is obtained.

If the available capacity of the second RAM 102 is not equal to or larger than the predetermined amount X (S8: NO), the RIP unit 111 sequentially writes the plurality of recording data into the second RAM 102 (S10), and the image processing unit 112 executes the recording processing on the recording data read out sequentially from the second RAM 102 (S27). On the other hand, if the available capacity of the second RAM 102 is equal to or larger than the predetermined amount X (S8: YES), the RIP unit 111 writes the recording data relating to the plurality of images I (refer to stage (d) in FIG. 6) aligned in the conveyance direction into the second RAM 102 (S9), and the image processing unit 112 executes the recording processing on the recording data read out from the second RAM 102 (S26). In this case, appropriate processing can be executed according to the available capacity of the second RAM 102.

If the number of images included in the image data is larger than the number of images input to the interface 150 (S6: YES), the RIP unit 111 executes the notification processing of notifying that the number of images included in the image data is larger than the number of images input to the interface 150 (S7). In this case, the user can recognize that the number of images included in the image data is larger than the number input to the interface 150, and can respond appropriately. In this way, it is possible to suppress the inability to implement the recording desired by the user.

In S7, the RIP unit 111 prompts the user to perform re-input to the interface 150 via the notification unit 160 (refer to FIG. 3). When re-input to the interface 150 is performed, the RIP unit 111 resumes the routine shown in FIG. 4. Then, based on the number of images re-input to the interface 150, the combination-record processing (S26, S27) is executed. In this case, the recording desired by the user can be implemented.

If the number of images included in the image data is equal to or less than the number of images input to the interface 150 (S6: NO), the combination-record processing (S26, S27) is executed based on the image data received in the receiving processing. If the number of images included in the image data is equal to or less than the number input to the interface 150, it is easy to implement the recording desired by the user without performing the notification processing (S7).

If image data including one image is received (S2: NO), the image processing unit 112 causes the conveyance mechanism 3 to convey the cut sheet Pc accommodated in the sheet feeding tray 20 (S5→S23: NO→S24). In this case, waste of the roll sheet Pr can be suppressed.

If it is determined that image data including a plurality of images is received (S2: YES) and the combination-recording is not to be performed (S3: NO), the image processing unit 112 causes the conveyance mechanism 3 to sequentially convey the cut sheets Pc accommodated in the sheet feeding tray 20 (S5→S23: NO→S24). In this case, waste of the roll sheet Pr can be suppressed.

SECOND EMBODIMENT

A printer (image recording apparatus) according to a second embodiment of the present disclosure is different from the first embodiment, in that the head 5 is of a laser type instead of an inkjet type.

In the first embodiment, the plurality of images I are continuously recorded in the conveyance direction (refer to stage (d) in FIG. 6) by deleting the margins A between the plurality of images I respectively included in two adjacent pages P1 to P3 (refer to stages (b) and (c) in FIG. 6).

On the other hand, in the second embodiment, the plurality of images I are continuously recorded in the conveyance direction by shifting a position, in the conveyance direction, of one or more images I among the plurality of images I in the corresponding pages P1 to P3 (refer to stage (d) in FIG. 6). For example, at stage (b) in FIG. 6, the image I in the first page (the most downstream page with respect to the conveyance direction) P1 is shifted to the upstream side with respect to the conveyance direction, the image I in the second page (a page other than the most downstream or upstream page with respect to the conveyance direction) P2 is shifted to the downstream side with respect to the conveyance direction, and the image I in the third page (the most upstream page with respect to the conveyance direction) P3 is shifted to the downstream side with respect to the conveyance direction.

In the configuration of the present embodiment, an output position of toner may be adjusted in the conveyance direction, and the configuration is preferable when the head 5 is of a laser type. Note that, when a large margin A is created at the downstream end of the third page P3 with respect to the conveyance direction due to the shifting of the position of the image I in the conveyance direction, the cutting position by the cutting mechanism 4 may be adjusted.

MODIFIED EMBODIMENTS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

In the embodiments described above, the number of images to be combined in the combination-recording is determined based on the user input. However, the present invention is not limited thereto. For example, the controller may determine the number of images to be combined by calculation or the like, based on image data received from an external apparatus.

An upper limit may be provided with respect to the number of images to be combined (for example, a value obtained by dividing a length of the roll sheet Pr in the conveyance direction by a length of the A4 size in the conveyance direction may be set as the upper limit), and an error notification may be performed when the upper limit is exceeded.

If the number of images included in the image data is larger than the number of images input to the interface 150 (S6: YES), the notification processing (S7) may not be performed, and the combination-record processing may be forcibly executed based on the number of images input to the interface 150.

Alternatively, if the number M of images included in the image data is larger than the number N of images input to the interface 150 (S6: YES), instead of the prompting for re-input in S7, a notification such as "Do you want to perform combining for M pages?" may be performed, and if YES, the combination-record processing for M pages may be executed, and if NO, the recording processing may be executed in a unit of one page without combining (M-N) pages.

In the embodiments described above, in the combination-record processing, the plurality of images I are continuously recorded in the conveyance direction (i.e., with no margin A in between), but may be recorded with the margin A in between without being limited thereto.

The sheet-shaped medium is not limited to paper, but may also be cloth or plastic film. That is, the sheet-shaped medium may be made of any material as long as it has a sheet shape.

The recorder may also eject liquid other than the ink (for example, treatment liquid that aggregates or precipitates components in the ink) when it is of a liquid discharge type. Also, the recorder is not limited to a liquid discharge type or a laser type, and may also be of a thermal transfer type or the like.

The present invention is not limited to the printer, and can also be applied to a facsimile, a copier, a complex machine, and the like.

The program according to the present disclosure can be distributed with being recorded on a removable recording medium such as a flexible disk or a fixed recording medium such as a hard disk, as well as can be distributed via a communication line.

What is claimed is:

1. An image recording apparatus comprising:
   a conveyance mechanism configured to convey a sheet-shaped medium in a conveyance direction;
   a recorder configured to record an image on the sheet-shaped medium conveyed by the conveyance mechanism;
   a temporary memory; and
   a controller configured to:
   receive image data including one or a plurality of images, each of the images being to be recorded on one page, the image data being provided from an external apparatus;
   determine whether to perform a combination-recording in which a plurality of images are aligned in the conveyance direction and recorded on a single sheet-shaped medium; and
   in a case where image data including the plurality of images is received and it is determined that the combination-recording is to be performed:
   cause the conveyance mechanism to convey a single sheet-shaped medium;
   perform data combining to combine, into one image data, image data including one or a plurality of images recorded on a first page and image data including one or a plurality of images recorded on a second page; and
   cause the recorder to record a plurality of images aligned in the conveyance direction on the single sheet-shaped medium, based on the one image data obtained by the data combining;
   wherein the controller includes a first controller configured to write recording data based on the image data into the temporary memory, and a second controller configured to cause the recorder to perform a recording based on the recording data read out from the temporary memory,
   wherein the controller is configured to determine whether an available capacity of the temporary memory is equal to or larger than a predetermined amount,
   wherein in a case where it is determined that the available capacity of the temporary memory is less than the predetermined amount, the first controller is configured to sequentially write a plurality of recording data each corresponding to each of the plurality of images to the temporary memory, and the second controller is configured to cause the recorder to perform the recording based on the plurality of recording data sequentially read out from the temporary memory, and

wherein in a case where it is determined that the available capacity of the temporary memory is equal to or larger than the predetermined amount, the first controller is configured to write recording data relating to the plurality of images aligned in the conveyance direction to the temporary memory, and the second controller is configured to cause the recorder to perform the recording based on the recording data read out from the temporary memory.

2. The image recording apparatus according to claim 1, wherein the controller is configured to cause the recorder to continuously record the plurality of images aligned in the conveyance direction.

3. The image recording apparatus according to claim 2, wherein the controller is configured to delete margins between the plurality of images respectively included in two adjacent pages to cause the recorder to continuously record the plurality of images aligned in the conveyance direction.

4. The image recording apparatus according to claim 2, wherein the controller is configured to shift a position, in the conveyance direction, of one or more images of the plurality of images in corresponding pages to cause the recorder to continuously record the plurality of images aligned in the conveyance direction.

5. The image recording apparatus according to claim 1, wherein the controller includes a first controller and a second controller,
wherein the first controller is configured to:
   generate a plurality of recording data each corresponding to each of the plurality of images, based on the image data; and
   sequentially output the plurality of recording data, and
wherein the second controller is configured to cause the recorder to record the plurality of images aligned in the conveyance direction on the single sheet-shaped medium, based on the plurality of recording data sequentially output from the first controller.

6. The image recording apparatus according to claim 1, wherein the controller includes a first controller and a second controller,
wherein the first controller is configured to:
   generate recording data relating to the plurality of images aligned in the conveyance direction, based on the image data; and
   output the recording data, and
wherein the second controller is configured to cause the recorder to record the plurality of images aligned in the conveyance direction on the single sheet-shaped medium, based on the recording data output from the first controller.

7. An image recording apparatus comprising:
a conveyance mechanism configured to convey a sheet-shaped medium in a conveyance direction;
a recorder configured to record an image on the sheet-shaped medium conveyed by the conveyance mechanism;
an interface; and
a controller configured to:
   receive image data including one or a plurality of images, each of the images being to be recorded on one page, the image data being provided from an external apparatus;
   determine whether to perform a combination-recording in which a plurality of images are aligned in the conveyance direction and recorded on a single sheet-shaped medium;

in a case where image data including the plurality of images is received and it is determined that the combination-recording is to be performed:
      cause the conveyance mechanism to convey a single sheet-shaped medium;
      perform data combining to combine, into one image data, image data including one or a plurality of images recorded on a first page and image data including one or a plurality of images recorded on a second page; and
      cause the recorder to record a plurality of images aligned in the conveyance direction on the single sheet-shaped medium, based on the one image data obtained by the data combining; and
   in a case where a number of images included in the received image data is larger than a number of images to be combined in the combination-recording input to the interface, to notify that the number of images included in the received image data is larger than the number of images input to the interface.

8. The image recording apparatus according to claim 7, wherein the controller is configured to:
   prompt re-input to the interface in the notification; and
   cause the recorder to perform the combination-recording based on a number of images re-input to the interface.

9. An image recording apparatus comprising:
a conveyance mechanism configured to convey a sheet-shaped medium in a conveyance direction;
a recorder configured to record an image on the sheet-shaped medium conveyed by the conveyance mechanism;
an interface; and
a controller configured to:
   receive image data including one or a plurality of images, each of the images being to be recorded on one page, the image data being provided from an external apparatus;
   determine whether to perform a combination-recording in which a plurality of images are aligned in the conveyance direction and recorded on a single sheet-shaped medium;
   in a case where image data including the plurality of images is received and it is determined that the combination-recording is to be performed:
      cause the conveyance mechanism to convey a single sheet-shaped medium;
      perform data combining to combine, into one image data, image data including one or a plurality of images recorded on a first page and image data including one or a plurality of images recorded on a second page; and
      cause the recorder to record a plurality of images aligned in the conveyance direction on the single sheet-shaped medium, based on the one image data obtained by the data combining; and
   in a case where a number of images included in the received image data is equal to or less than a number of images to be combined in the combination-recording input to the interface, to cause the recorder to perform the combination-recording based on the received image data.

10. An image recording apparatus comprising:
a conveyance mechanism configured to convey a sheet-shaped medium in a conveyance direction;

a recorder configured to record an image on the sheet-shaped medium conveyed by the conveyance mechanism;

a first accommodation part in which a roll body having a configuration where a sheet-shaped medium is rolled in a roll shape is accommodated;

a second accommodation part in which a plurality of sheet-shaped media are accommodated in a state of being stacked; and a controller configured to:

receive image data including one or a plurality of images, each of the images being to be recorded on one page, the image data being provided from an external apparatus;

determine whether to perform a combination-recording in which a plurality of images are aligned in the conveyance direction and recorded on a single sheet-shaped medium;

in a case where image data including the plurality of images is received and it is determined that the combination-recording is to be performed:

cause the conveyance mechanism to convey a single sheet-shaped medium;

perform data combining to combine, into one image data, image data including one or a plurality of images recorded on a first page and image data including one or a plurality of images recorded on a second page; and cause the recorder to record a plurality of images aligned in the conveyance direction on the single sheet-shaped medium, based on the one image data obtained by the data combining; and in a case where image data including one image is received, to cause the conveyance mechanism to convey the sheet-shaped medium accommodated in the second accommodation part.

11. An image recording apparatus comprising:

a conveyance mechanism configured to convey a sheet-shaped medium in a conveyance direction;

a recorder configured to record an image on the sheet-shaped medium conveyed by the conveyance mechanism;

a first accommodation part in which a roll body having a configuration where a sheet-shaped medium is rolled in a roll shape is accommodated; and a second accommodation part in which a plurality of sheet-shaped media are accommodated in a state of being stacked; and a controller configured to:

receive image data including one or a plurality of images, each of the images being to be recorded on one page, the image data being provided from an external apparatus;

determine whether to perform a combination-recording in which a plurality of images are aligned in the conveyance direction and recorded on a single sheet-shaped medium;

in a case where image data including the plurality of images is received and it is determined that the combination-recording is to be performed:

cause the conveyance mechanism to convey a single sheet-shaped medium;

perform data combining to combine, into one image data, image data including one or a plurality of images recorded on a first page and image data including one or a plurality of images recorded on a second page; and cause the recorder to record a plurality of images aligned in the conveyance direction on the single sheet-shaped medium, based on the one image data obtained by the data combining; and in a case where image data including a plurality of images is received and it is determined that the combination-recording is not to be performed, to cause the conveyance mechanism to sequentially convey the sheet-shaped media accommodated in the second accommodation part.

* * * * *